May 20, 1969   R. E. BEARD   3,445,767
PULSE RATE TO CURRENT CONVERTING AND LINEAR LOG INDICATING
Filed Oct. 11, 1965   Sheet 1 of 3

LINEAR SCALE
A

2 DECADE SCALE
B

4 DECADE SCALE
C

4 DECADE LOGARITHMIC SCALE
D   (PRIOR ART)

INVENTOR
Rex. E. Beard
BY
ATTORNEYS

INVENTOR
Rex E. Beard

May 20, 1969  R. E. BEARD  3,445,767
PULSE RATE TO CURRENT CONVERTING AND LINEAR LOG INDICATING
Filed Oct. 11, 1965  Sheet 3 of 3
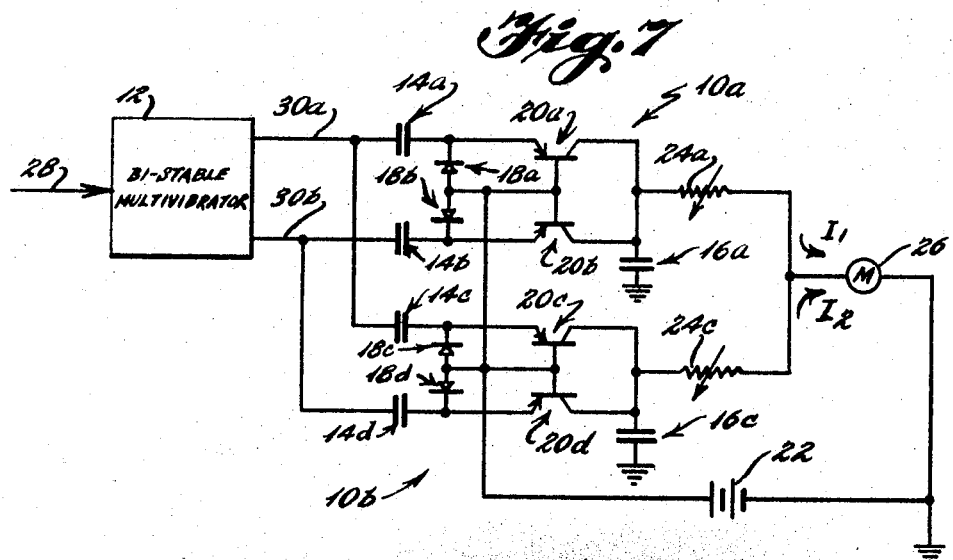
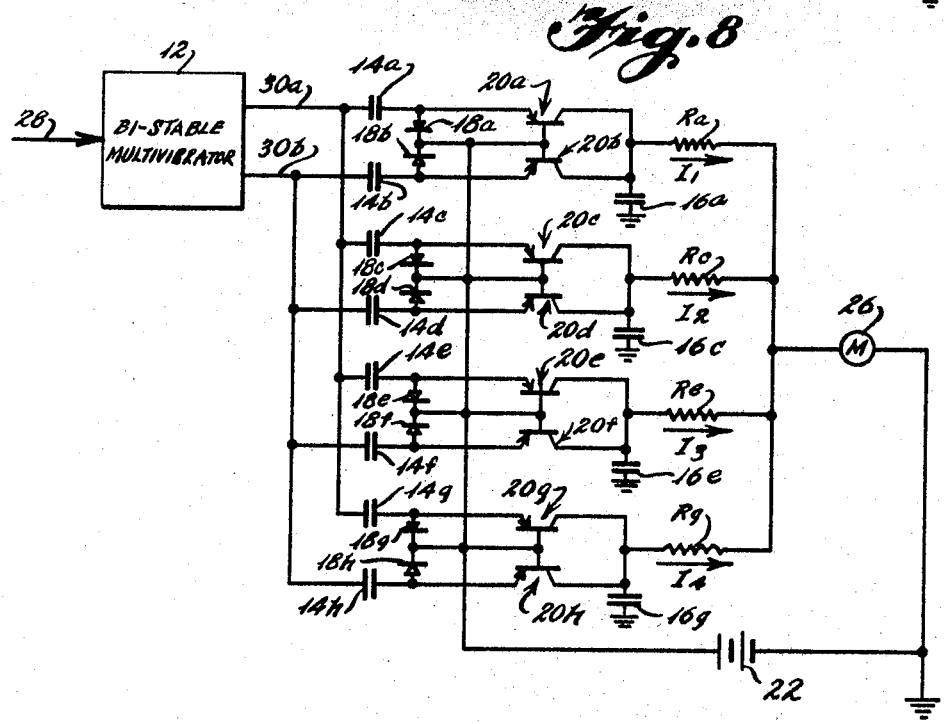
INVENTOR
Rex Beard
BY
ATTORNEYS

United States Patent Office 3,445,767
Patented May 20, 1969

3,445,767
PULSE RATE TO CURRENT CONVERTING AND LINEAR LOG INDICATING
Rex E. Beard, Santa Fe, N. Mex., assignor to Eberline Instrument Corporation, Santa Fe, N. Mex.
Filed Oct. 11, 1965, Ser. No. 494,574
Int. Cl. G01r 23/02, 11/00
U.S. Cl. 324—78                                    8 Claims

ABSTRACT OF THE DISCLOSURE

Random charges appearing on a multivibrator are converted to pulses of equal quantity, and these are fed to a first capacitor in series with an emitter of a transistor. The collector of the transistor is connected to a second capacitor. The base of the transistor is connected to a constant source of potential and, via a diode, to the junction between the first capacitor and the emitter. A resistor and series connected meter with linear scale indications bridge the second capacitor. The meter indicator is deflected linearly with increasing frequency until the potential at the collector of the transistor is equal to the potential source connected to the base of the transistor. Parallel operation of two or more of the basic circuits described above, each with a different range of frequency response and with the output currents added to the same meter movement will result in a compact arrangement with scales on the meter face divided into repetitive steps each step having a scale with equally spaced graduations.

---

This invention relates to a method, apparatus, circuit and system for converting a series of electrical pulses to a direct current and finds particular utility when utilized in a pulse count meter to determine the time rate of occurrence of such series of electrical pulses.

In many applications, such as, and by way of example only, in a radiation detector having a Geiger counter tube, it is desirable to produce a deflection of a meter movement which is mathematically related to the time rate of occurrence of electrical pulses.

In a Geiger counter, for example, the Geiger-Mueller tube produces an electrical pulse each time a charged particle passes therethrough. The time rate of occurrence of such pulses may be utilized to define a level of radiation intensity for measuring purposes.

Previously, various circuits have been suggested for producing meter deflections based upon such an electrical pulse rate. The scale ordinarily utilized with the meter movement of such devices has previously been graduated or marked either linearly or logarithmically. The linear scale ordinarily is of very limited range, or the individual scale graduations or markings necessarily cover a large range of values. While the logarithmic scale is capable of a very wide range, the nature of the logarithmic scale demands that the starting point be greater than zero and the individual scale markings or graduations are not equally spaced apart, resulting in an instrument which is difficult to read, especially when it is necessary to interpolate between individual scale markings or graduations.

Accordingly, it is an object of this invention to provide an electrical pulse count meter having a scale which combines the advantages of both linear graduations and logarithmic graduations.

Another object of this invention is to provide a pulse count meter having a scale arrangement of several decades or steps, the meter scale markings within each decade or step being linearly spaced.

A further object of this invention is to provide an electrical circuit which converts the time rate of occurrence of electrical pulses into a direct electric current to deflect a meter movement indicator.

A still further object of this invention is to provide an electrical circuit which converts the time rate of occurrence of electrical pulses into a direct electric current varying directly proportional to the pulse frequency to deflect a meter movement which will indicate the pulse frequency on a linearly graduated scale.

Yet another object of this invention is to provide an electrical circuit which converts the time rate of occurrence of electrical pulses into a direct electric current varying directly proportional to the pulse frequency until a given pulse frequency above which the current produced will be constant.

A yet still further object of this invention is to provide a plurality of circuit components which each converts the time rate of occurrence of electrical pulses into direct electrical currents, the current output of each circuit component varying directly proportional to the input pulse frequency until a given pulse frequency above which the current output produced will be constant, each circuit component having a different frequency response and a different saturation level to deflect a meter movement to produce meter responses which are linear within a plurality of decades or steps, each decade or step corresponding to the frequency response of a given circuit component.

Still another object of this invention is to provide a plurality of circuit components which convert the time rate of occurrence of electrical pulses into D.C. currents, each circuit component having a different frequency response to deflect a meter movement to produce meter responses with unique and advantageous characteristics.

Still a further object of this inventiton is to provide a conversion circuit to provide indications on a meter which are normally in logarithmic form in linear form scales, even though the meter scale may comprise several linear decade scales.

Yet still another object of this invention is to provide a method of converting a series of electrical pulses into a D.C. current proportional to the time rate of occurrence of the pulses.

Still a further object of this invention is to provide a method of converting a series of electrical pulses into a plurality of D.C. currents proportional to the frequency of the input pulses but varying in slope.

Yet another object of this invention is to provide a method of driving an electrical meter movement enabling the scale of the meter movement to be graduated in a series of steps or decades, the individual steps or decades being linear.

Yet another and still further object of this invention is to provide a scale for a meter, the scale being divided into a plurality of steps or decades, the scale graduations within each step or decade being equally spaced.

Other objects, advantages, and important features of the invention will be apparent from a study of the specification following, which taken with the drawings, together show, describe, disclose and illustrate various embodiments and modifications of the invention.

In the drawings:

FIGURE 7 is a schematic showing of a circuit for converting the time rate of occurrence of electrical pulse into a direct electric current to deflect a meter movement wherein the meter movement scale would show two decades or steps.

FIGURE 8 is a schematic showing of a circuit similar to the circuit of FIGURE 7 but having a four decade or or step output.

Figure 2:
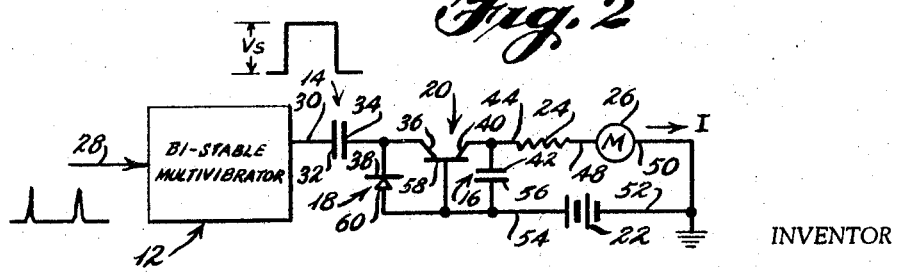
FIGURE 2 is a schematic showing of a basic circuit which converts the time rate of occurrence of electrical pulses into a direct electric current to deflect a meter movement.

Refering now to FIGURE 2 of the drawing, there is shown and illustrated a circuit 10 comprising a bistable device such as a multivibrator 12, capacitors 14 and 16, a diode 18, a transistor 20, a voltage source 22, a resistor 24 and a meter movement 26. The multivibrator 12 is provided with an input 28 and an output 30 and is a device which changes the state of the output 30 between two possible states each time an input signal is applied to the input 28. In other words, an input pulse applied to the input 28 will change the output 30 from one state or condition to a second state or condition if initially in the first state or condition, and vice versa. The first state or condition may, for example, comprise an "off" state while the second state or condition comprises an "on" state or condition.

The output 30 of the multivibrator 12 is connected to one plate 32 of the capacitor 14 with the other plate 34 of the capacitor 14 being connected to the emitter 36 of the transistor 20 and to the cathode 38 of the diode 18. The collector 40 of the transistor 20 is connected to one plate 42 of the capacitor 16 and to one terminal 44 of the resistor 24. The other terminal 46 of the resistor 24 is connected to one terminal 48 of the meter movement 26 with the other terminal 50 of the meter movement 26 connected to the negative terminal 52 of the voltage source 22. The positive terminal 54 of the voltage source 22 is connected to the second plate 56 of the capacitor 16, the base 58 of the transistor 20 and to the anode terminal 60 of the diode 18.

Assuming that the output 30 of the multivibrator 12 is in the off state thereof, if a pulse is applied to the input 28 of the multivibrator 12, then the output 30 thereof will be switched, that is, turned on. Defining the voltage difference between the two states of the multivibrator as $V_s$, then when the output 30 is on or positive, the charge on the capacitor 14 will flow into the emitter 36 of the transmitter 20. Assuming that the emitter to base voltage drop of the transistor 20 is negligible, the charge Q which flows will be equal to the capacitance $C_1$ of the capacitor, designated as 14, times the voltage difference $V_s$, or $Q=C_1V_s$. With a high gain transistor, the charge that flows from the collector 40 will be very nearly equal to Q.

When a second pulse is applied to the input 28 of the multivibrator 12, the output 30 thereof will be switched off, and the capacitor 14 will be recharged through the diode 18.

If a series of input pulses is applied to the input 28 of the multivibrator 12 at a frequency $f$, the current I flowing into the emitter 36 of the transistor 20 will be the charge per unit time, or $I=Qf/2$, since only the positive going half of the signal is utilized. Since $Q=C_1V_s$, $I=C_1V_sf/2$. The collector current from the collector 40 of the transistor 20 will be very close to this, as the charge Q was.

Figure 3:
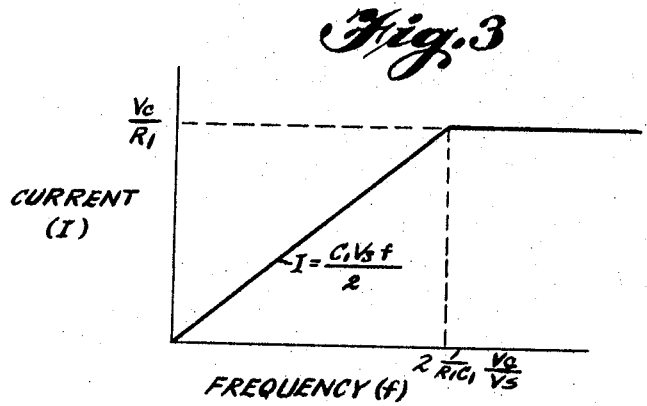
FIGURE 3 is a diagrammatic showing of the output current produced by the circuit of FIGURE 2 plotted against the frequency of the input electrical pulses thereto.

This collector current I flows through the resistor 24 and the meter movement 26 causing a deflection of the meter movement 26. The resistor 24 and the capacitor 16 provide a time constant which determines the response time of the meter movement 26. The voltage V present at the collector 40 of the transistor 20 will be equal to the current flow I times the resistance $R_1$ of the resistor 24, or $V=IR_1$. The current I will hold to the above relationship until the collector voltage V of the transistor 20 is equal to the voltage $V_c$ of the voltage source 22. At this point, saturation will occur and no more current will be available. At frequencies above this saturation point, a constant current will be supplied to the meter movement 26 equal to the supply voltage $V_c$ divided by the resistance $R_1$ of the resistor 24, or $I=V_c/R_1$. The frequency $f$ at which such saturation occurs is radially calculated to be $f=2V_c/R_1C_1V_s$. A graphic representation of the current I versus the frequency $f$ of the circuit of FIGURE 2 is shown in FIGURE 3.

Accordingly, random charges appearing on a bistable multivibrator are converted into current pulses of equal quantity and stored in a capacitor, a resistor and a meter in series bridging this capacitor. The current pulses from the bistable multivibrator are applied to a capacitor connected to the emitter of a transistor, the base of which is connected not only to a constant source of potential but through a diode to one side of the capacitor which is initially charged by action of the bistable multivibrator. The current output from this circuit, and the resulting meter deflection is therefore directly proportional to the time rate of occurrence of the input pulses, or the frequency thereof, up to a point at which the collector voltage of the transistor equals the voltage of the constant source, at which point the system will become saturated and the current flow for greater frequencies of input pulses becomes a constant.

Figure 4:
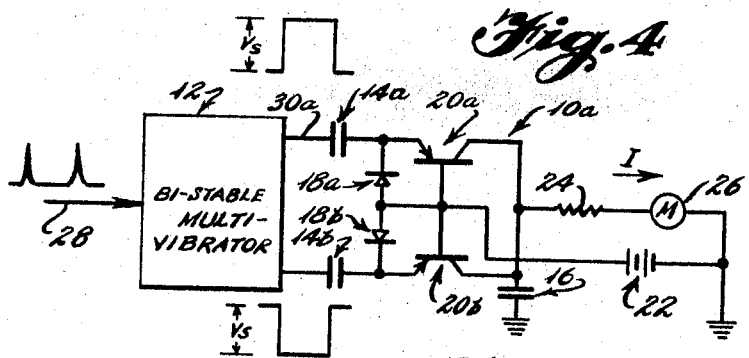
FIGURE 4 is a schematic showing of a modified circuit for converting the time rate of occurrence of electrical pulses into a direct electric current.

Referring now to FIGURE 4, wherein like reference characters are used for like parts, if the driving bistable multivibrator 12 has complementary outputs 30a and 30b, that is, one output high when the other output is low, and vice versa, the basic circuit of FIGURE 2 can be readily expanded to a circuit 10a to provide full current output with each pulse input, or a full wave output, since one of the outputs 30a and 30b is positive going for each input pulse applied to the input 28 of the multivibrator 12.

By providing a separate capacitor 14a, diode 18a and transistor 20a for output 30a and a separate capacitor 14b, diode 18b and transistor 20b for the output 30b of the multivibrator 12, it is readily apparent that full current flow I will be supplied to the resistor 24 for each input pulse applied to the input 28 of the multivibrator 12. The operation of the circuit of FIGURE 4 is identical to that of the circuit of FIGURE 2, except that the collector currents of the two transistors 20a and 20b will be added through the resistor 24 and the meter movement 26. This will eliminate the factor of ½ in the equations and relationships above, and the meter current I will be equal to the capacitance $C_1$ of the capacitors times the voltage difference $V_s$ of the multivibrator outputs 30a and 30b multiplied by the frequency $f$ of the input pulses, or, $I=C_1V_sf$. The saturation frequency will, obviously, be one-half that of the circuit of FIGURE 2, or $f=V_c/R_1C_1V_s$.

Figure 5:
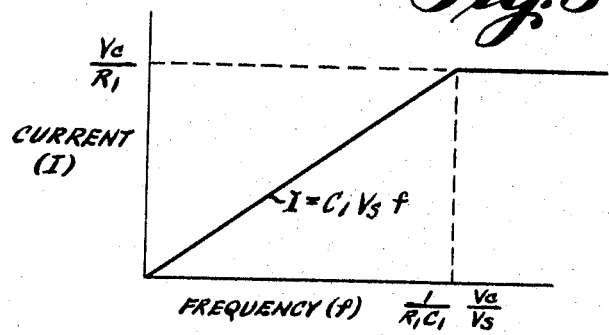
FIGURE 5 is a diagrammatic showing of the output current of the circuit of FIGURE 4 plotted against the input pulse frequency thereto.

A graph of the output current I plotted against the input frequency $f$ for the circuit of FIGURE 4 is shown in FIGURE 5.

Figure 6:
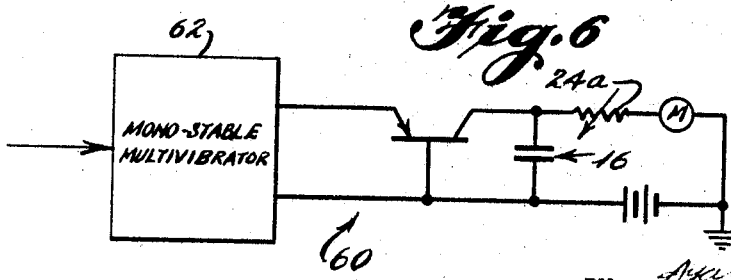
FIGURE 6 is a schematic showing of an alternative embodiment of the basic conversion circuit of this invention for converting the time rate of occurrence of electrical pulses into a direct electric current to deflect a meter movement.

Referring now to FIGURE 6, an alternate circuit 60 to do the same job and produce the same output as the circuit 10a of FIGURE 4 is shown. In the circuit 60, however, a monostable multivibrator 62 is substituted for the bistable multivibrator device 12, the capacitors 14 and the diodes 18 of the circuit 10a of FIGURE 4. The response of this circuit would be the same as that of the circuit 10a, with the exception that the pulse width of the monostable multivibrator 62 is controlled to change the frequency response. That is, the output current in the meter range is directly proportional to the fixed pulse width which is established at any desired value and the variable input pulse frequency in the circuit component 60 of FIGURE 6 whereas in the circuit component 10a of FIGURE 4 the output current varies directly as the product of the selected fixed capacitance $C_1$ and the variable input pulse frequency $f$.

Additionally, certain novel features of the circuits of FIGURES 2, 4, and 6 may not have been fully emphasized hereinbefore. For example, if provision is included for enabling the value of the series resistor 24 to be regulated or varied, then varying this resistance will allow the operator to readily change the response time of the meter. Response time of the meter is defined as the time required, after the measured quantity has been abruptly changed to a new constant value, for the meter movement to come to apparent rest at the new indication. In the above described circuits the response time for the meter movement 26 is equal to $R_1$ the resistance of the resistor 24 times $C_2$, the capacitance of the capacitor 16, or $R_1C_2$. It will be noted that I is independent of the value of $R_1$ up to the point where $IR_1=V_c$, and as long as $R_1$ maximum is such that $R_1$ multiplied by full scale I does not exceed $V_c$, any change in this limited $R_1$ will not affect the value of the indicated I. This is a big advantage when measuring nuclear radiation, for example, with the statistical deviations inherent therein. The operator who desires an accurate reading, as opposed to a quick reading, can slow the response time by increasing the variable $R_1$ resistance, while if a fast response to changes in radiation effects is desired, the response time of the meter movement can be speeded up, or decreased by decreasing the variable resistance $R_1$, even though at such a fast response time the meter may be subject to some fluctuation. For this type of application the full scale deflection of the meter movement should be such that the full scale current times the maximum resistance would never reach saturation.

In previous circuits for this use, that is, where current output is an indicator of frequency input, the resistance cannot be varied without producing a change in the meter current. Therefore, most circuits switch in more or less capacitance to change the time constant, that is, the response time of the meter. This varying of the capacitance in a circuit is more complex and expensive than the provision for variable resistance in the present circuits.

Each of the circuits shown in FIGURES 2, 4, and 6 and discussed above yield a linear response of the meter movement proportional to the frequency of the input pulses. Parallel operation of two or more of these circuits, each with a different frequency response, and with the output currents added in the same meter movement, will yield a highly convenient meter presentation. Such a circuit, combining two of the basic full wave circuits of FIGURE 4 is shown schematically in FIGURE 7.

Referring now to FIGURE 7 of the drawing, there is shown and illustrated a circuit essentially composed of a circuit 10a as shown and described above coupled with a second circuit 10b connected in parallel thereto. The circuit component 10a is actually identical to the circuit 10a of FIGURE 4, comprising the bistable multivibrator 12, the capacitors 14a and 14b, the diodes 18a and 18b, the transistors 20a and 20b, the capacitor 16, the resistor 24 and the meter movement 26. The operation of this part of the circuit is identical with the circuit of FIGURE 4, and the component values identical thereto. In particular, the capacitors 14a and 14b are of a value $C_1$, and the capacitor 16 has a value of $C_2$. The resulting current output $I_1$ produced being defined as $I_1=V_sC_1f$ and the saturation frequency $f$ being $V_c/R_1C_1V_s$.

The circuit component 10b is similar to the circuit component 10a, being driven by the same multivibrator 12 and driving the same meter movement 26. The circuit component 10b comprises the capacitors 14c and 14d, the diodes 18c and 18d, the transistors 20c and 20d, the capacitor 16c and the resistor 24c. Selecting the value of the capacitors 14c and 14d as $10C_1$ and the value of the capacitor 16c as $10C_2$, results in the output current $I_2$ from the circuit component 10b being ten times the output current $I_1$ of the circuit component 10a since $I_2=10C_1V_sf$. The saturation frequency of the circuit component 10b, similarly, would be $\frac{1}{10}$ of the saturation frequency of the circuit component 10a since $f=V_c/10C_1R_1V_s$. Adjusting the resistance 24c to result in approximately one-half of full-scale meter deflection of the meter movement 26, with the resistance 24a being adjusted to full-scale meter deflection thereof to enable the meter scale to be marked in increments of $f/10$ linearly to the half-scale point to respond to the current $I_2$ of circuit component 10b. Above the half-scale deflection current, $I_2$ remains constant, but $I_1$ changes proportionally to $f$, so that the scale between half-scale and full-scale may be marked in increments of $f$. The resulting scale, therefore, will be linear within any one decade, and stepped to produce several decades of frequency response, resulting in the range characteristics of a logarithmic scale together with the ease of reading and interpolation inherent in a linear scale.

Either the capacitance $C_1$ of the capacitors 14 or the signal voltage $V_s$ from the multivibrator 12 may be adjusted or selected to give the desired frequency response. Either the resistance of the resistor 24c or the voltage $V_c$ of the voltage source 22 may be adjusted or selected to give the desired saturation level current for 12. The resistance of the resistor 24a may then be adjusted or selected for the desired saturation level for current $I_1$.

The circuit components 60 of FIGURE 6 may also be used in paralleled multiples in a similar manner, except that a monostable multivibrator must be provided for each leg or component with the several pulse widths thereof being established at desired multiples, normally by decades of the smallest value.

The parallel employment of these elemental circuits or components yields a new and unique type of readout on the meter face. In the configuration of FIGURE 7, for example, the scale would be linear, that is, the angular displacement of the meter movement indicator needle would be directly proportional to the frequency change from zero to a frequency of $f/10$. This would be adjusted to saturate at approximately one-half of the full-scale meter deflection. This means that the leg or component of the circuit contributing the major portion of the current through the meter movement up to approximately one-half of full meter current is the one containing the resistance of resistor 24c, while the other leg or component, through the resistance of resistor 24a contributes $\frac{1}{11}$ of the current through the meter movement 26. When the half-scale point is reached, the leg including resistor 24c becomes saturated, that is, it continues to contribute a constant current value to the meter movement 26 regardless of further increases in input pulse frequency, but the leg including resistor 24a increases the current increment thereof supplied to the meter movement in direct proportion to the input pulse frequency until it reaches the saturation point thereof, or, in this instance, at full meter current. The superimposed current $I_1$ is linearly responsive to the input pulse frequency, and thus the second half of the indicator travel of the meter movement 26 is directly proportional to the pulse frequency changes between the two saturation points. The ratio of the indicator travel to the frequency change is, however, approximately one-tenth that of the indicator travel observed in the first half-scale range of the indicator movement. The one-to-ten ratio could, obviously, be changed to any desired ratio.

This response pattern is similar to a logarithmic scale with two significant and important differences. That is, the scale starts at zero, and the scale is linear within any decade.

Although as herein described and illustrated, the steps have been treated as being decade steps, any other convenient steps or ratios may be readily utilized in one meter movement. These stages or circuit components may be paralleled to provide 2, 3, 4, or any number of decades steps or other ratios desired and the response will always remain linear within any one decade or step.

Referring now to FIGURE 8, it may be readily seen that paralleling four basic circuit components 10a, 10b, 10c and 10d, each differing by 10 times the frequency response will result in a scale of even greater range. In this circuit, $I_4$ is defined as the current corresponding to the lowest frequencies and equals $10^3 C_1 V_s f$. $I_4$ will saturate when $I_4 = V_c/R_4$ and this is adjusted to occur at approximately one-fourth full-scale deflection and at ten frequency units. The response time for $I_4$ is $10^3 C_2 R_4$.

$I_3$ is added thereto and provides for the second quarter scale and equals $10^2 C_1 V_s f$. The saturation level for $I_3$ occurs near half scale at 100 frequency units and the response time for $I_3 = 10^2 C_2 R_3$. $I_2$ is added thereto and provides for the third quarter scale and saturates near three-quarter scale in a similar manner at 1000 frequency units. $I_2 = 10 C_1 V_s f$ and the response time for $I_2$ is $10 C_2 R_2$. Finally, $I_1$ completes the scale up to 10,000 frequency units, the current $I_1$ equaling $C_1 V_s f$ and having a response time of $C_2 R_2$.

Figure 1:
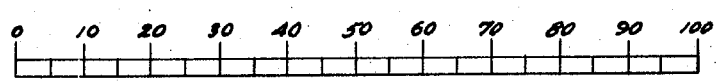
FIGURE 1 shows a plurality of scales appropriate for meter movements constructed according to the present novel invention together with a typical fully logarithmic scale for comparison.
Figure 1:
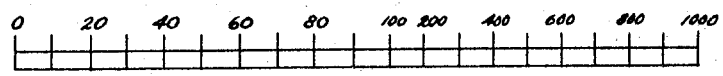
Figure 1:
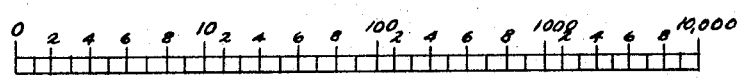
Figure 1:
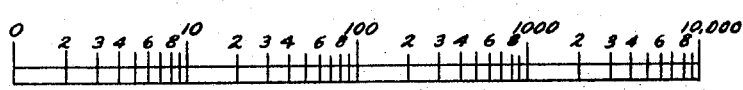

Referring now to FIGURE 1, there is shown a series of meter scales showing the resulting type of scale graduation utilized with this invention and clearly demonstrating the advantages thereof. FIGURE 1 shows a typical linear scale A suitable for use with either of the basic circuits of FIGURES 2, 4, or 6. The subject novel invention, however, is especially useful to produce meter scales such as the two decade scale B of FIGURE 1, suitable for use with the circuit of FIGURE 7, or the four decade scale C of FIGURE 1, suitable for use with the circuit of FIGURE 8. Also in FIGURE 1 is included to show a logarithmic scale D having a similar four decade range to clearly show the advantages of the novel scale resulting from the present invention.

While in each of the schematics of the drawing PNP type transistors have been shown and illustrated, and disclosed and the operation described assuming such transistors, it is readily apparent that transistors of the NPN type may be readily substituted therefor merely by reversing the polarity of the voltage supply 22 and the polarity of the diodes 18.

Furthermore, instead of the currents from each of the paralleled circuit components being added in the meter movement 26, that is, passing in the same direction therethrough, they could be alternatively additive and subtractive. This way, the first circuit component would deflect the meter movement upscale proportional to $f$. The next circuit component would deflect the meter movement downscale proportional to $10f$, etc. An auxiliary indicator would have to be included, obviously, to inform the operator which decade to read, but utilizing such an arrangement would have the advantage of providing for maximum readability because full scale meter deflection would be utilized for each decade, thereby allowing clearer increments, or a greater number of increments to be marked on the meter scale for each decade.

Calibration of the device, and adjustment of each of the response factors is easily obtained by making any of the appropriate components variable to adjust the slope and the saturation current for calibration. For example, slope adjustment may be easily accomplished by providing for an adjustable shunt for the meter movement 26 and providing for varying the series resistors 24 to allow adjustment of the saturation points.

Likewise bistable devices other than the multivibrator 12, such as, and by way of example only, electromechanical relays, may be utilized. Furthermore, although the particular circuit discussions hereabove have assumed a pulse input, any time varying input could be measured with the instant invention.

While the invention has been described and disclosed in terms of certain embodiments or modifications which it has assumed in practice, the scope of the invention should not be deemed to be limited by the precise certain embodiments or modifications herein shown, illustrated, described and disclosed, such other embodiments or modifications as may be suggested to those having the benefit of the teachings herein being intended to be reserved especially as they fall within the scope and breadth of the claims hereto appended.

What is claimed is:

1. An apparatus for indicating the time rate of occurrence of a series of electric pulses comprising:
   first means for converting the time rate of occurrence of a series of electrical pulses into a first D.C. current proportional to such time rate of occurrence up to a predetermined time rate thereof above which said first D.C. current is constant;
   second means for converting the time rate of occurrence of the series of electrical pulses into a second D.C. current proportional to such time rate of occurrence up to a second predetermined time rate greater than said first mentioned predetermined time rate above which said second D.C. current is constant;
   a summation network connected to the output of said first and second means; and
   meter means connected to said summation network for indicating the time rate of occurrence of said series of electrical pulses.

2. The apparatus as defined in claim 1 wherein:
   said second D.C. current is proportional to said time rate of occurrence at a different constant of proportionality than said first D.C. current.

3. The apparatus as defined in claim 1 wherein:
   said meter is provided with a scale having a plurality of logarithmic steps,
   the scale graduations within each step being linearly spaced.

4. The apparatus as defined in claim 1 wherein each of said first and second means comprises:
   means for providing a series of electric currents of predetermined duration proportional in rate to the time rate of occurrence of such series of electrical pulses, and
   means for storing said electric currents and applying the electric currents to said meter means.

5. An apparatus for indicating the time rate of occurrence of a series of electrical pulses comprising:
   a bistable multivibrator device having a pair of complementary outputs, the states of which alternate with each input pulse applied thereto;
   first and second branch circuit means connected to said outputs;
   each of said first and second branch circuit means comprising:
   a first transistor having an emitter, a collector and a base;
   a first capacitor connected in series with one of the outputs of said bistable device and the emitter of said first transistor;
   a first diode connected between the base and the emitter of said first transistor;
   a second transistor having an emitter, a collector and a base;
   a second capacitor connected in series between the other of said outputs of said bistable device and the emitter of said second transistor;
   a second diode connected between the base and the emitter of said second transistor;
   the base of said first transistor being connected to the base of said second transistor;
   the collector of said first transistor being connected to the collector of said second transistor;
   a meter circuit connected between the collectors of the transistors of said first and second branch circuit means and the bases of said transistors;

said meter circuit comprising:
a meter movement and a source of electric potential connected in series,
one termination of said series connected meter and potential source being connected to the bases of said transistors,
a first resistor connected between the collectors of the transistors of said first branch circuit means and the other termination of said series connected meter and source of electric potential,
a third capacitor connected between said first branch circuit means at the collectors of the transistors thereof and the junction of said meter movement with said source of electric potential,
a second resistor connected between the collectors of said transistors of said second branch circuit means and the said other termination of said series connected meter and source of electric potential, and
a fourth capacitor connected between said second branch circuit means at the collectors of the transistors thereof and the junction of said meter movement with said source of electric potential;
the capacitance of the capacitors associated with said first branch circuit means differing from the capacitance of the capacitors associated with said second branch circuit means by a multiplying factor.

6. An apparatus for indicating the time rate of occurrence of a series of electric pulses comprising:
first means for converting the time rate of occurrence of a series of electrical pulses into a first D.C. current proportional to such time rate of occurrence up to a predetermined time rate thereof above which said first D.C. current is constant;
second means for converting the time rate of occurrence of the series of electrical pulses into a second D.C. current proportional to such time rate of occurrence up to a second predetermined time rate greater than said first mentioned predetermined time rate above which said second D.C. current is constant;
third means for converting the time rate of occurrence of the series of electrical pulses into a third D.C. current proportional to such time rate of occurrence up to a third time greater than said first mentioned predetermined time rate above which said third D.C. current is constant;
a summation network connected to the outputs of said first, second and third means; and
meter means connected to said summation network for indicating the time rate of occurrence of said series of electrical pulses.

7. The apparatus as defined in claim 6 wherein said meter is provided with a scale having a plurality of logarithmic steps,
the scale graduations within each step being linearly spaced.

8. An apparatus for indicating the time rate of occurrence of a series of electrical pulses comprising:
a multivibrator device for providing a series of output currents in response to such series of electrical pulses applied to the input thereof;
a plurality of branch circuit means connected to the output of said multivibrator device;
each of said branch circuit means including a summation network providing a D.C. current proportional to the time rate of occurrence of such series of electrical pulses;
the ratio of each such D.C. current to the time rate of occurrence differing from each other of the D.C. currents by a multiplying factor;
each of said D.C. currents becoming constant at a predetermined rate of occurrence;
meter means connected to the output of said summation network; and
a scale associated with said meter means to provide an indication of said time rate of occurrence;
said scale being divided into a plurality of steps;
each of said steps corresponding to the output of one of said plurality of branch circuit means;
the graduations within each step being linearly spaced.

References Cited

UNITED STATES PATENTS

| | | |
|---|---|---|
| 2,755,441 | 7/1956 | Gulnac. |
| 2,934,703 | 4/1960 | Cohen. |
| 2,955,202 | 10/1960 | Scourtes. |
| 2,999,168 | 9/1961 | Henry. |
| 3,038,130 | 6/1962 | Gordon. |
| 3,209,251 | 9/1965 | Edgington et al. |
| 3,209,253 | 9/1965 | Gray. |
| 3,235,811 | 2/1966 | Steiger. |
| 3,300,719 | 1/1967 | Thomas. |
| 3,302,110 | 1/1967 | Hopengarten. |
| 3,350,637 | 10/1967 | Pochtar. |

FOREIGN PATENTS

| | | |
|---|---|---|
| 1,368,316 | 6/1964 | France. |
| 6,403,084 | 11/1964 | Netherlands. |

RUDOLPH V. ROLINEC, *Primary Examiner.*

P. F. WILLE, *Assistant Examiner.*

U.S. Cl. X.R.

324—70